United States Patent [19]
Christiaens et al.

[11] Patent Number: 5,544,739
[45] Date of Patent: Aug. 13, 1996

[54] INSTALLATION FOR THE TEMPORARY STORAGE OF BULK GOODS

[75] Inventors: Jozef P. M. Christiaens; Petrus G. A. M. Christiaens, both of Horst, Netherlands

[73] Assignee: Christiaens B.V., Horst, Netherlands

[21] Appl. No.: 302,797

[22] PCT Filed: Mar. 10, 1993

[86] PCT No.: PCT/NL93/00056

§ 371 Date: Nov. 8, 1994

§ 102(e) Date: Nov. 8, 1994

[87] PCT Pub. No.: WO93/17986

PCT Pub. Date: Sep. 16, 1993

[30] Foreign Application Priority Data

Mar. 10, 1992 [NL] Netherlands .......................... 9200443

[51] Int. Cl.⁶ ................................................. B65G 25/00
[52] U.S. Cl. .................................... 198/750.6; 414/525.9
[58] Field of Search ........................... 198/750.1, 750.2, 198/750.5, 750.6; 414/325, 525.1

[56] References Cited

U.S. PATENT DOCUMENTS

| 4,184,587 | 1/1980 | Hallstrom | 198/750.2 |
| 4,798,802 | 1/1989 | Ryan | 414/525.9 X |
| 4,966,275 | 10/1990 | Hallstrom, Jr. | 198/750.6 |
| 5,000,647 | 3/1991 | Foster | 414/535.9 |
| 5,092,732 | 3/1992 | Foster | 198/750.6 X |
| 5,263,573 | 11/1993 | Hallstrom, Jr. | 198/750.6 |

FOREIGN PATENT DOCUMENTS

| 3910847 | 10/1990 | Germany . |
| 2227470 | 8/1990 | United Kingdom . |

*Primary Examiner*—James R. Bidwell
*Attorney, Agent, or Firm*—Young & Thompson

[57] ABSTRACT

An installation for the temporary storage of bulk good, such as a composting tunnel, comprises a number of supported floor plates (1), which are slidable in their longitudinal direction, for receiving the bulk goods, the floor plates (1) are jointly movable from their rest position in order to discharge the bulk goods, whereas some of the number of floor plates (1) are individually movable back to the rest position, in which case the bulk good are prevented from moving back by the other plates which, in each case, are not moving. In connection with bringing the floor plates (1) into motion, a separate drive means (3) is provided which comprise a frame (13) with a base consisting of a number of base plates (14), each of which can be coupled to an opposite associated floor plate (1). The base plates (14) are each slidable in the frame (13) in their longitudinal direction and at least a few subsets of the plates are drivable by their own drive installation (17).

9 Claims, 4 Drawing Sheets

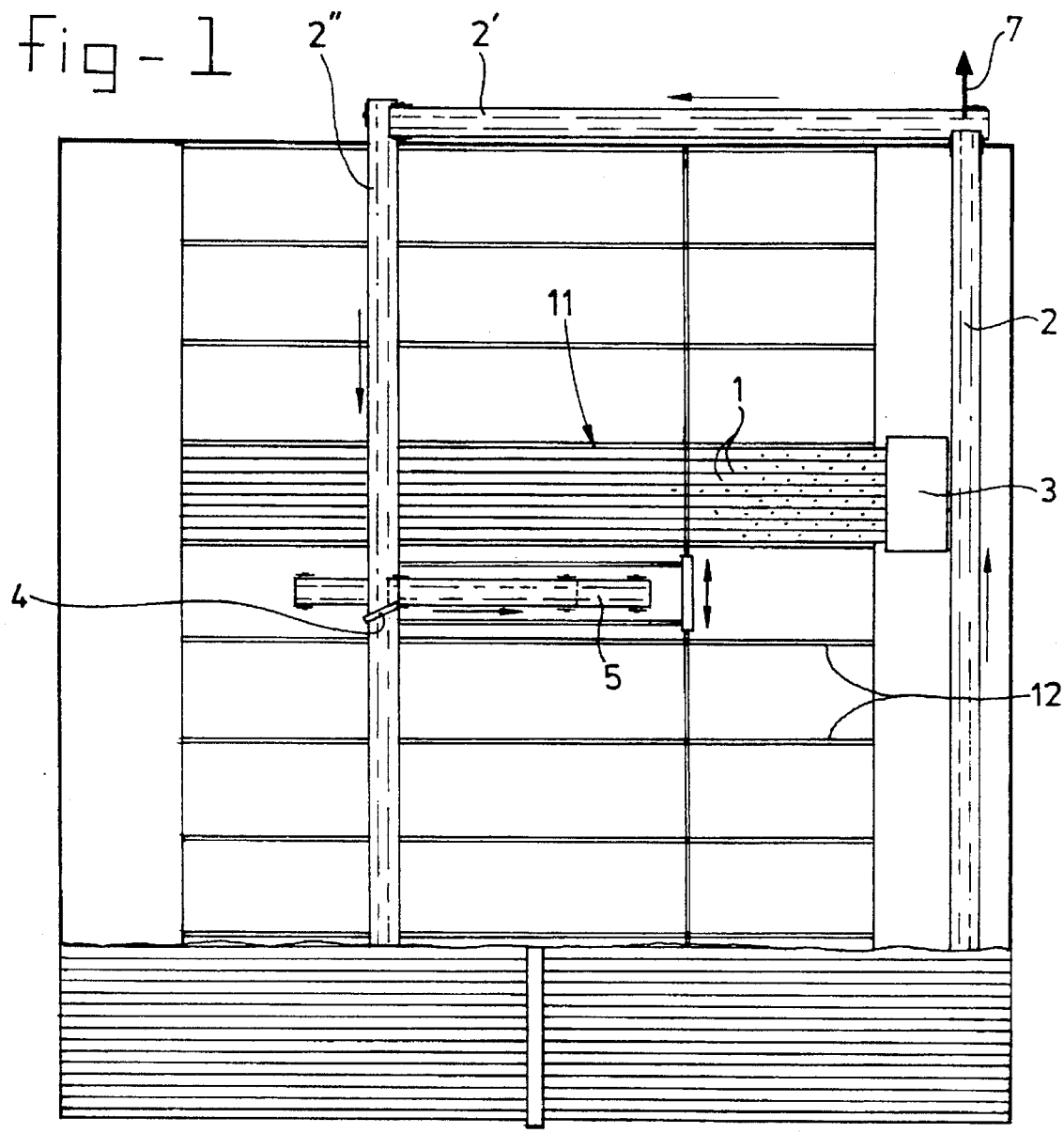
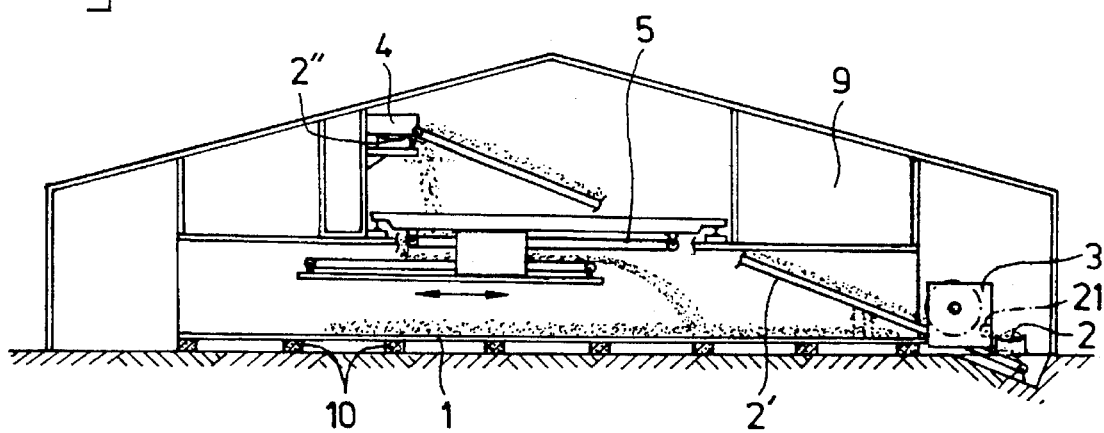

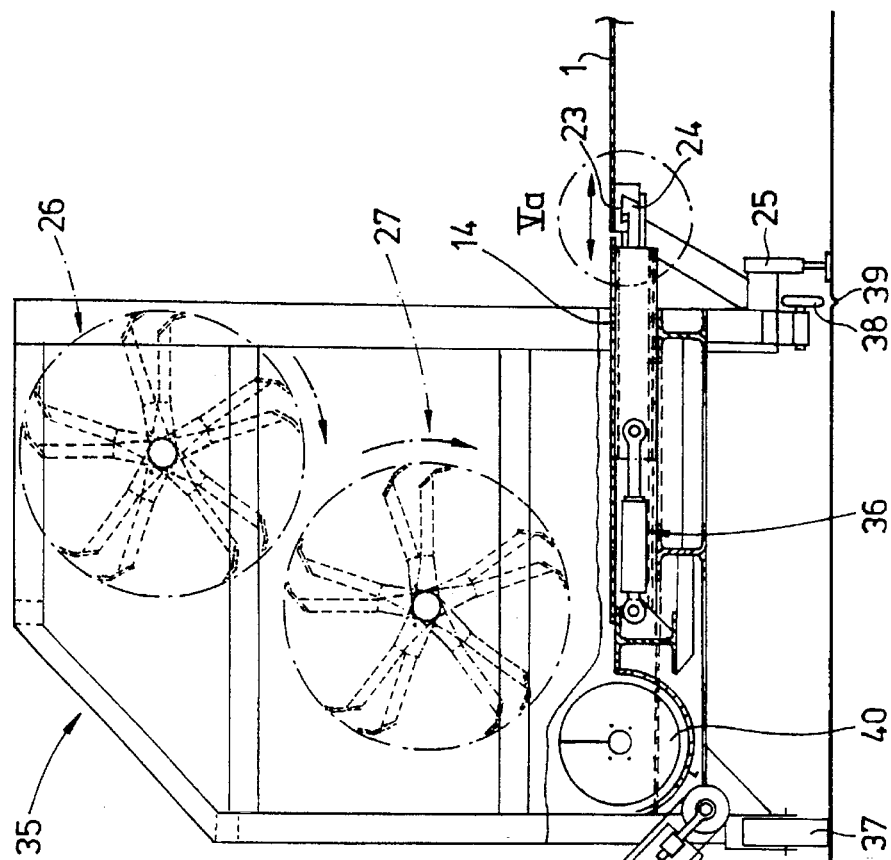
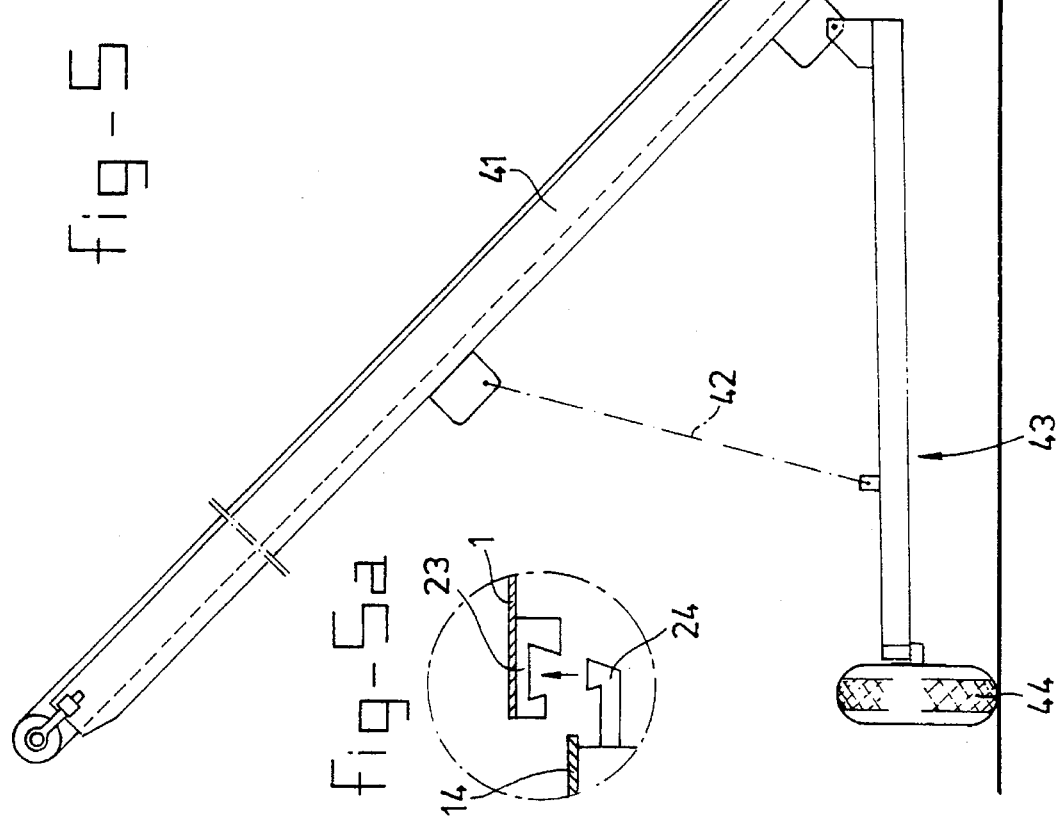
fig-5
fig-5a

INSTALLATION FOR THE TEMPORARY STORAGE OF BULK GOODS

FIELD OF THE INVENTION

The invention relates to the field of temporary storage of bulk goods, such as in a composting tunnel, comprising a floor, walls and a cover, feed means for feeding the bulk goods onto the floor and discharge means for discharging the bulk goods from the installation.

BACKGROUND OF THE INVENTION

An installation of this type is generally known. It can be used in particular for the preparation of compost, for example for the cultivation of mushrooms.

The bulk goods are fed in at one end of the floor and discharged at the opposite end. In the case of a composting tunnel, the compost can develop in the period between feed and discharge. For transport over the floor it is known first to lay a net on the floor and then to tip the bulk goods onto said net. The net is slowly pulled over the floor and a supplementary layer of plastic can be placed between floor and net in order to reduce friction.

The known installations have a number of disadvantages. Firstly, the layer of plastic prevents good aeration of the bulk goods. This design is therefore not very suitable for composting tunnels. Furthermore, the dimensions of the known installation are fairly large. A large chamber is needed to receive the finished compost which comes from the tunnel. Moreover, especially when preparing compost, vapours hazardous to health frequently arise. In a large chamber of this type it is not easily possible to provide good ventilation everywhere and consequently carrying out work in said chamber is not without problems.

It is known from DE-A 3 910 847 to construct the floor with a number of floor plates to receive the bulk goods, which plates are slidably supported in their longitudinal direction in such a way that the bulk goods can be discharged by joint movement of the plates from their rest position and that by repeatedly moving back some of the number of plates individually to the rest position, the bulk goods are prevented from moving back by the other plates which, in each case are not moving. It is thus possible to discharge the bulk goods from the floor without having to use a net with a layer of film beneath it and without staff having to enter the tunnel.

Installations of this type can have a large floor surface area. One composting installation, for example, has several composting tunnels alongside one another, which together form an appreciable floor surface area.

SUMMARY OF THE INVENTION

The object of the invention is to provide a drive for the movable floor plates, with which, on the one hand, all floor plates, even in the case of a large floor surface area, can be actuated and, on the other hand, the drive can remain limited and thus economical.

This object is achieved by providing a drive means for an installation of this type, which drive means comprises a frame with a base consisting of a number of base plates, each of which can be coupled to an opposite associated floor plate, which base plates are each slidable in the frame in their longitudinal direction and at least a few subsets of which plates are drivable by their own drive installation.

In the case of collective driving of all floor plates coupled to the drive means, the bulk goods, such as compost, present on said floor plates move unhindered with said plates. Moving back one or a few floor plates again has no effect on the bulk goods and the bulk goods can be moved forwards by successively repeating this movement sequence.

Preferably each base plate can be driven independently by means of an associated piston-cylinder device which is coupled to the frame.

To simplify the coupling of the drive means and floor plates the latter each preferably have a downwards pointing hook element into which an upwards pointing hook element of a base plate can hook. Hook elements of this type can, for example, be caused to interact with one another by sliding said elements sideways into one another.

However, preference is given to a design in which the hook elements of each base plate are movable in the vertical direction in such a way that when said hook elements are in a low position the floor plates are uncoupled from the base plates and when said hook elements are moved upwards they engage with the hook elements of the floor plates. The vertical movement of the hook elements of each base plate can, for example, be obtained by the frame being provided with jacking means on the side on which the hook elements of the base plates are located.

A spit shaft can be rotatably mounted on the frame above the base plates, which spit shaft has a number of radially projecting spit blades for distributing the bulk goods red in over the base. A transverse, horizontal screw jack for homogenising the bulk goods can also be present on the side of the base opposite the coupling side.

A single drive means can now suffice in the case of an installation which has a large floor surface area, for example comprising several composting tunnels. To this end the frame is movable for successive actuation of individual sets of floor plates.

BRIEF DESCRIPTION OF THE DRAWINGS

The invention will now be explained in mope detail with the aid of an illustrative embodiment shown in the figures.

FIG. 1 shows a top view of a composting installation.

FIG. 2 shows a front view of the installation according to FIG. 1.

Figure 4:
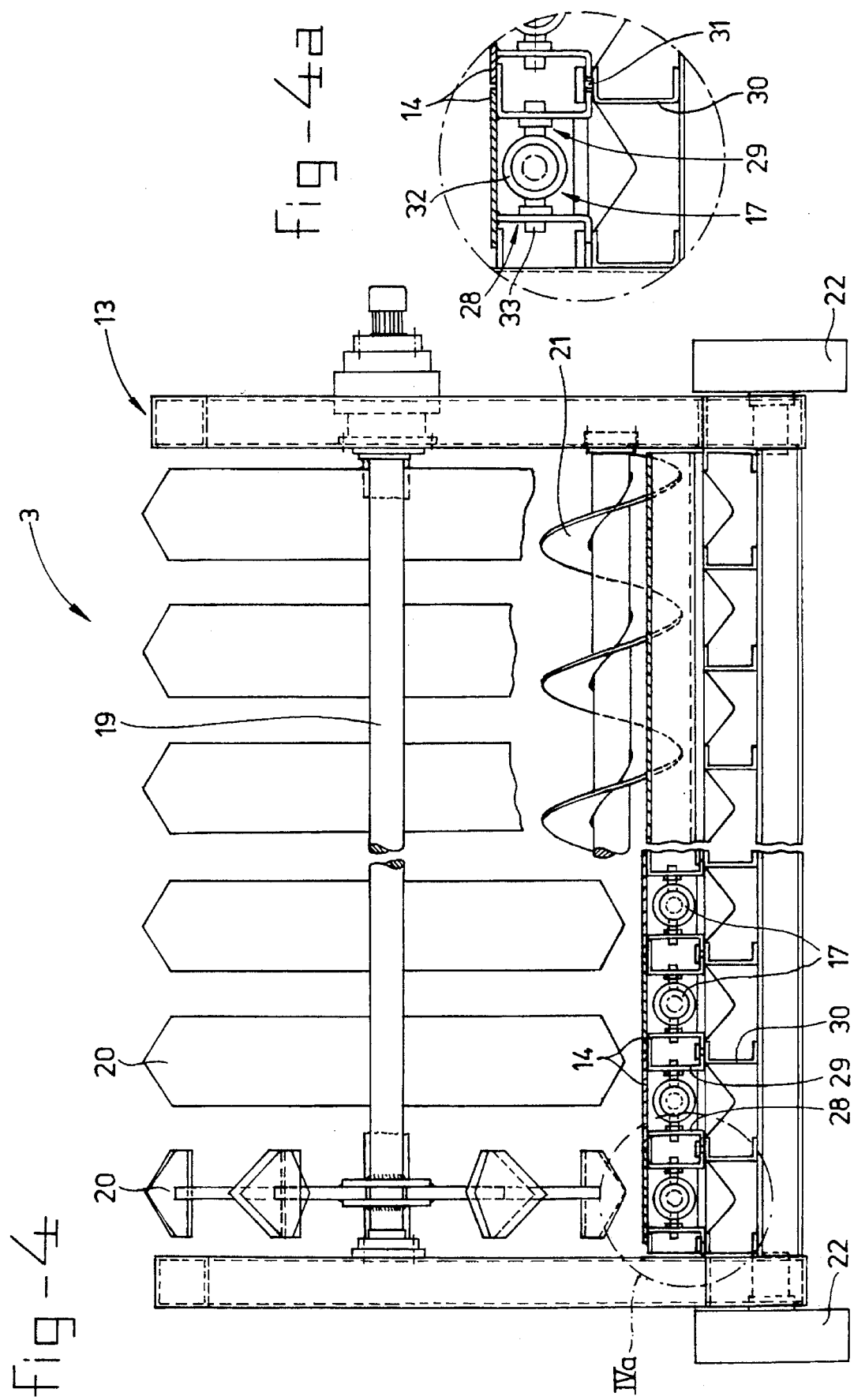
FIG. 4 shows a front view of a drive means.

FIG. $4^a$ shows a detail $IV^a$ of FIG. 4.

FIG. 5 shows a side view of a variant of the drive means.

FIG. $5^a$ shows a detail $V^a$ of FIG. 5.

DETAILED DESCRIPTION OF THE INVENTION

The composting installation shown in FIGS. 1 and 2 has a floor made of plastic or metal plates 1 which are supported by blocks 10, made Of, for example, plastic or concrete, at some distance above the ground and are slidable backwards and forwards in the direction of the arrows. The plates can be driven by means of the drive means 3 to be described below. In this respect they are moved jointly per set of plates 11 towards the right in FIG. 1 and are moved back again individually or a few at a time.

During the joint movement the compost on the plates moves unhindered with the plates, whereas when one or a few plates is or are moved back the compost is retained by the other stationary plates. Via the drive means the compost comes onto the conveyor belt 2. The finished compost can then be discharged at 7.

Figure 3:
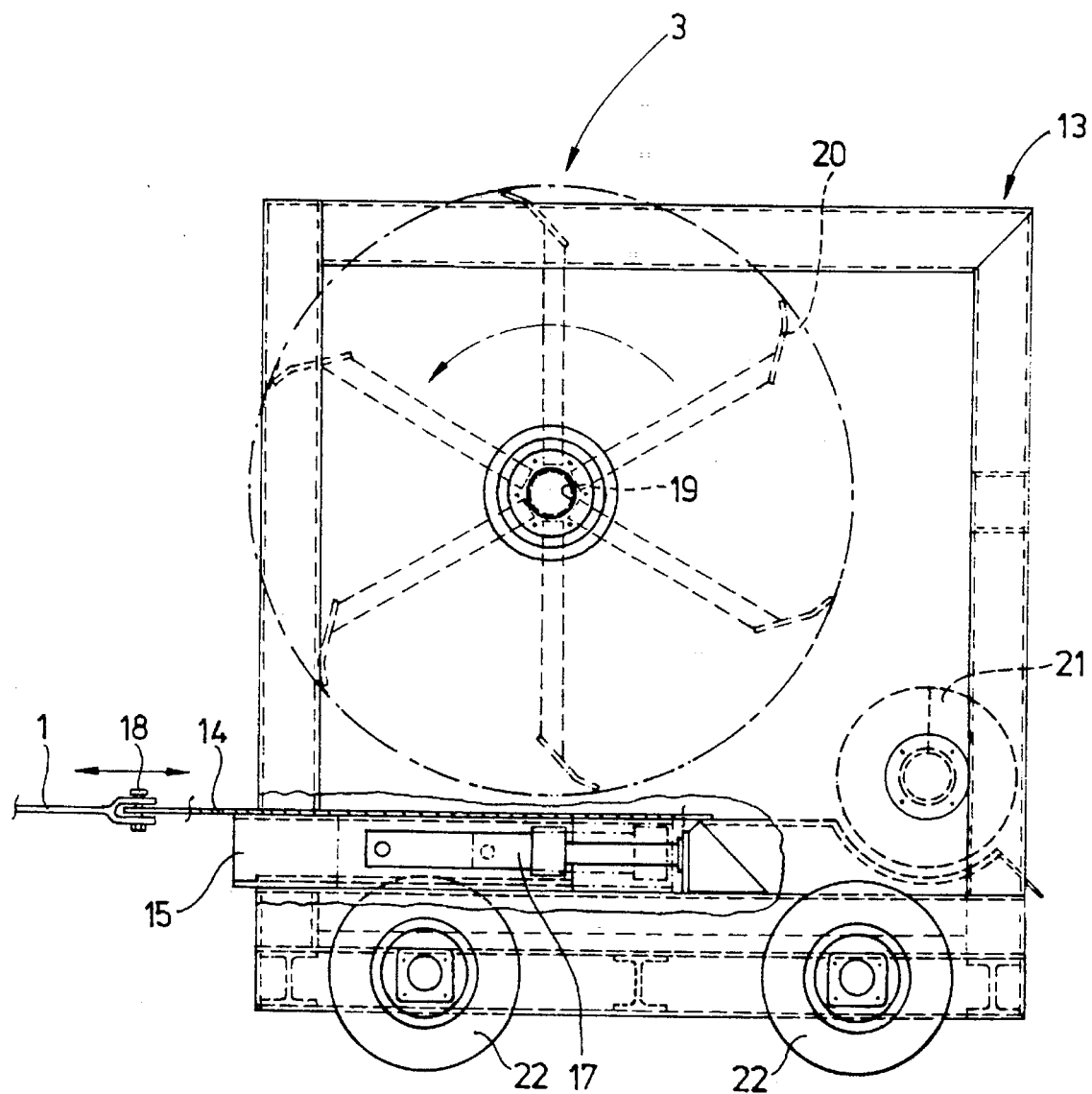
FIG. 3 shows a side view of a drive means.

As an alternative the compost can, however, be diverted via conveyor belts 2' and 2". As can be seen in FIG. 2, conveyor belt 2' slopes upwards. The compost is then fed via the deflection element 4 located at a slant above conveyor belt 2" onto the telescopic, fourth conveyor belt 5. By means of conveyor belt 5 the compost can be evenly distributed over the sets of plates 11 of the individual tunnels. These tunnels are each delimited by two walls 12. The yapours formed during the composting process can be removed via chamber 9. With reference to FIGS. 3 and 4 it can be seen that the drive means 3 has a frame 13 on which the base plates 14 are slidably supported. To this end the base plates Pest on supporting sections 30. Each base plate is slidable in its longitudinal direction by means of its own piston-cylinder device 17, which is fixed to the frame. By means of suitable control, the base plates can be moved simultaneously to the left in FIG. 3 and each plate individually can be moved to the right.

As shown in FIG. 4$^a$ (detail IV$^a$ of FIG. 4), each base plate 14 of the frame 13 is fixed, for example by welding, to two sliding sections 28, 29. The sliding sections 28, 29 are each slidably retained on a supporting section 30 and protected against lifting by means of a strip 31 fixed to supporting section 30. The housing 32 of the piston-cylinder device 17 is fixed to, in each case, one pair of sliding sections 28, 29 by means of pins 33; the piston is fixed to the frame 13.

As each base plate 14 is coupled to a floor plate 1 by means of, for example, coupling pin 18, the floor plates of each set 11 move in the same way as the base plates 14. In this arrangement the compost ends up on the base plates 14 and, for the purposes of a uniform feed, the spit shaft 19 with spit blades 20 is fitted in frame 13.

When the spit shaft 19 is rotated in the direction of the arrow the spit blades constantly scrape off a uniform layer from the compost heap on the floor plates 1. This prevents too much compost from falling on the base plates 14 at the same time, which would render good discharge more difficult.

The compost is homogenised by means of screwed spindle 21, after which it falls onto the conveyor belt 2.

The frame has wheels 22 on which it can be moved between the various sets 11 of floor plates. The drive means is thus able to actuate a complete composting installation. Its dimensions are limited, as a result of which an appreciable saving in space can be achieved compared with the installations comprising nets which have been used hitherto.

The variant of the drive means which is shown in FIGS. 5 and 5 has a frame 35 on which base plates 14 which are slidable in their longitudinal direction are also provided. These base plates 14 can be coupled to the floor plates 1 by means of hook elements 23, 24, which are shown in more detail in detail V$^a$. Each floor plate 1 has a downwards pointing, swallowtail-shaped hook element 23, whereas each base plate has an upwards pointing, likewise swallowtail-shaped hook element 24. Hook elements 23, 24 of this type can, for example, be caused to interact with one another by sliding them sideways into one another when the floor plates 1 and the base plates 14 are at the same level. However, it is simpler to bring hook element 24 from below into the space formed in hook element 23. It is true that in this case said hook elements 23, 24 have a small free travel when floor plates 1 move backwards and forwards with the base plates 14 coupled thereto, but this is not a problem in view of the stroke of the piston-cylinder device 36.

In the case of this design the drive means is coupled to the floor plates 1 as follows. Initially the frame 35 is supported on the wheels 37 and 38. Wheel 38 can optionally run in a channel-shaped recess 39 or on a rail, which is not shown. Consequently the frame B5 is always in the correct position with respect to the floor plates 1, in the longitudinal direction thereof. As soon as the frame 35, that is to say its base plates 14, is or are again in the correct lateral position with respect to a set of floor plates 1 of a tunnel, the lifting jack device 25 is actuated. By this means that side of the frame 35 on which the lifting jack device 25 is located is raised such that hook elements 24 engage with hook elements 23.

Each floor plate 1 can then be moved in the desired manner by means of the piston-cylinder device 36.

Both a first spit shaft 26 and a second spit shaft 27 are used when moving the material present on the floor plate to the outside. The spit shaft 26 digs off that part of the material which was present in the top of the tunnel, whereas the spit shaft 27 feeds said material as well as the lower material to the jack 40.

A conveyor belt 41 which can be brought into the desired position by means of a lifting device 42, which is not shown in detail, is also fixed to the frame 35. Lifting device 42 is supported on an auxiliary frame 43, which, by means of wheel 44, is movable together with frame 35. The compost discharged from the tunnel installation can be further discharged by means of the conveyor belt 41.

We claim:

1. Drive means (3) for an installation for the temporary storage of bulk goods, which installation comprises a number of supported floor plates (1), which are slidable in their longitudinal direction, for receiving the bulk goods, said floor plates (1) being jointly movable from their rest position in order to discharge the bulk goods, and some of the number of plates (1) being individually movable back to the rest position, in which case the bulk goods are prevented from moving back by the other floor plates (1) which, in each case, are not moving, said drive means adapted to be positioned opposite one end of said floor plates (1) and comprising a frame (13) having a base consisting of a number of base plates (14), each base plate (14) including coupling means (24) which can be brought into cooperation with corresponding coupling means (23) provided at said end of an associated floor plate (1), said base plates (14) being each slidable in the frame (13) in their longitudinal direction and at least a few subsets of said plates being drivable by their own drive installation, whereby the frame is displaceable between individual sets (11) of floor plates for successive actuation thereof.

2. Drive means (3) according to claim 1, wherein each base plate (14) can be driven independently by means of an associated piston-cylinder device (17) which is coupled to the frame (13).

3. Drive means (3) according to claim 1, wherein each floor plate (1) has a downwards pointing hook element (23) into which an upwards pointing hook element (24) of a base plate (14) can hook.

4. Drive means (3) according to claim 3, wherein the hook elements (23, 24) are swallowtail-shaped.

5. Drive means (3) according to claim 3, wherein the hook elements (24) of each base plate (14) are movable in the vertical direction in such a way that when said hook elements (24) are in a low position the floor plates (1) are uncoupled from the base plates (14), and when said hook elements (24) are moved upwards they engage with the hook elements (23) of the floor plates (1).

6. Drive means (3) according to claim 5, wherein the frame (13) is provided with lifting jack means (25) on the side on which the hook elements (24) of the base plates (14) are located.

7. Drive means (3) according to claim 1, wherein at least one spit shaft (19) is rotatably mounted in the frame (13) above the base plates (14), which spit shaft (19) has a number of radially projecting spit blades (20) for distributing the bulk goods fed in over the base.

8. Drive means (3) according to claim 7, wherein a first spit shaft (26) is mounted at a high level and a second spit shaft (27) is mounted at a low level.

9. Drive means (3) according to claim 1, wherein a transverse, horizontal screw jack (21) for homogenising the bulk goods is present on the side of the base opposite to the coupling side.

* * * * *